Dec. 23, 1952            L. C. NEUFELD            2,622,929

NOZZLE STRUCTURE FOR WINDSHIELD CLEANING DEVICES

Filed Aug. 19, 1949

INVENTOR.
LEONARD C. NEUFELD
BY Rudolph L. Lowell
ATT'Y

Patented Dec. 23, 1952

2,622,929

UNITED STATES PATENT OFFICE 2,622,929

NOZZLE STRUCTURE FOR WINDSHIELD CLEANING DEVICES

Leonard C. Neufeld, Des Moines, Iowa, assignor, by mesne assignments, to The Delman Company, Des Moines, Iowa, a partnership Application August 19, 1949, Serial No. 111,134

4 Claims. (Cl. 299—73)

This invention relates generally to cleaning devices for vehicle windshields and in particular to a nozzle unit in such devices for directing liquid streams in opposite directions onto the windshield of an automobile.

An object of this invention is to provide an improved nozzle for giving a directional application to a jet or stream of fluid.

Another object of this invention is to provide a nozzle unit for a vehicle windshield cleaner adapted to be mounted between the ends of the windshield and having adjustable discharge ball members for directing liquid jets in opposite directions onto the windshield and into the path of travel of the usual windshield wipers.

Still a further object of this invention is to provide an adjustable nozzle for a vehicle windshield cleaner, which is of a compact and rugged construction, economical to manufacture, efficient in operation and readily maintained in any adjusted position.

A feature of this invention is found in the provision of a nozzle for a windshield clearing device comprising, a body member formed with a substantially Y-shaped transverse fluid passage, with one end of such passage constituting an inlet and the remaining two ends outlets. Each outlet is formed with an annular cavity, the bottom of which is open to the fluid passage, whereby to provide an annular shoulder open to the outside of the body member. Fitted within each cavity is a rubber washer having a center opening for frictionally receiving an adjustable jet ball member, such that the ball engages the annular shoulder. A dish shaped spring washer, wedged within the side wall of the cavity and against the ball member, retains the ball member on the shoulder and against lateral movement relative to the rubber washer. On insertion of a pin or the like, within the jet opening in the ball member, adjustment of the ball member for a desired directional application of the jet is simply accomplished and then frictionally maintained.

Further objects, features and advantages of this invention will become apparent from the following description when taken in connection with the accompanying drawing, in which.

Figure 3:
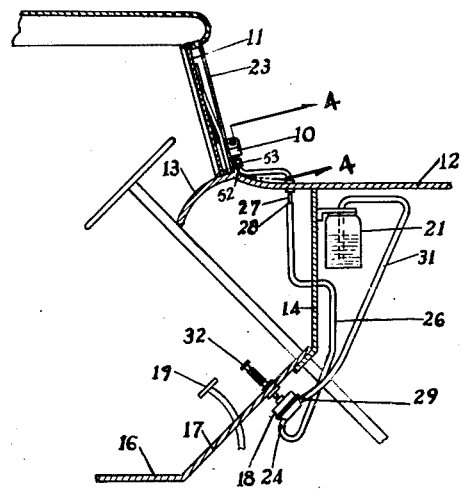
Fig. 3 is a fragmentary longitudinal sectional view of the front portion of a vehicle showing the assembly therewith of a windshield clearing system which embodies the nozzle unit of this invention.
Figure 2:
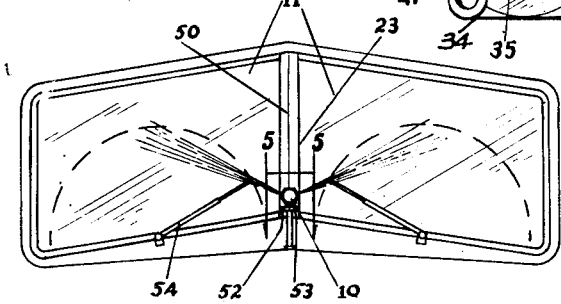
Fig. 2 is a fragmentary front view of a vehicle windshield showing the invention of the nozzle unit thereon.

With reference to the drawings, the nozzle 10 of this invention is shown in Figs. 2 and 3 embodied in a windshield clearing system which is applied to a vehicle having a divided windshield 11, an engine cowl 12 extended forwardly of the windshield, and an instrument panel or dashboard 13 located rearwardly thereof. The automobile is further equipped with a usual fire wall 14 and a floor board 16 having an upwardly and forwardly inclined portion 17 which joins with the lower end of the fire wall 14.

The windshield clearing system (Fig. 3) includes a pump unit 18 supported from the floorboard portion 17 at a position adjacent to the vehicle clutch pedal 19, a liquid glass container or reservoir 21 carried on the front side of the fire wall 14, and the nozzle 10 which is mounted on a dividing strip 23 for the windshield 11.

The pump unit 18 has an outlet 24 connected through a flexible conduit 26 with the lower end of a liquid supply tube 27 for the nozzle 10, with the supply tube 27 being extended through the cowl 12 and connected with the fluid conduit 26, as indicated at 28. The pump inlet 29 is connected by a flexible conduit 31 with the liquid container 21. A foot operated plunger 32, for the pump unit 18, extends upwardly from the floorboard portion 17 at a position near the clutch pedal 19. The pump 18 is of a diaphragm type and the plunger 32 is operated in a manner substantially similar to the usual operation of a foot light switch (not shown). The inlet 29 and outlet 24 are provided with reversely actuated one-way valves (not shown), operable in response to the pressure of the fluid in the pump, and with fluid under pressure being discharged from the nozzle 10 on depression of the foot plunger 32.

Figure 1:
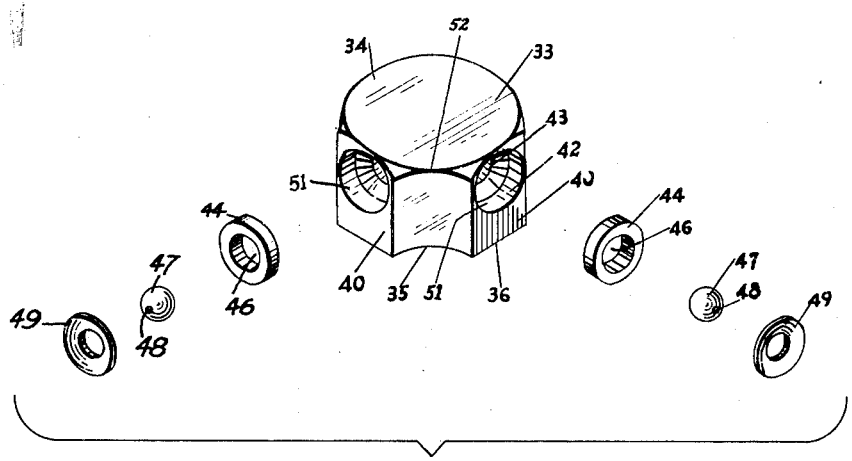
Fig. 1 is an exploded perspective view of the nozzle unit of this invention.
Figure 4:
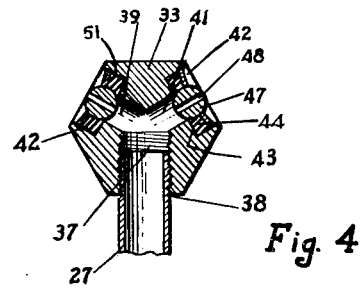
Fig. 4 is an enlarged transverse sectional view of the nozzle unit taken along the line 4—4 in Fig. 3.
Figure 5:
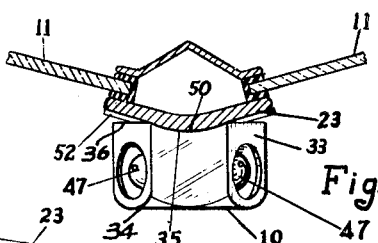
Fig. 5 is an enlarged plan view of the nozzle as seen along the line 5—5 in Fig. 2.

The nozzle 10 includes a body member 33 (Figs. 1 and 4) of a polygonal shape in transverse cross section and illustrated in Fig. 1 as having six side surfaces. One end 34 of the body member 33, which for convenience shall be referred to as its front end, is of a curved or dome shape, while the rear end 36 of the body member is of a flat shape, and formed with an arcuate groove 35. Formed within the body member, and as best appears in Fig. 4, is a transverse fluid passage 37, of a substantially Y-shape having a lower end section 38 constituting an inlet and connectible with the supply tube 27. The remaining two upper end sections 39 and 41 define outlets for the passage 37. The inlet 38 and outlets 39 and 41 terminate in separate outer faces of the body member 33.

Each outlet section 39 and 41 of the fluid passage 37 terminates in an annular cavity 42 (Fig. 1) arranged concentrically relative to the outlet sections 39 and 41 so as to form annular shoulders 43 within each outlet section open to the outside of the body member 33. The cavities 42 thus form enlarged terminal portions for the outlet sections 39 and 41.

Received within each cavity 42 and against a corresponding shoulder 43 is a fluid-sealing washer 44, of a rubber composition, having a central opening 46 of a size adapted to frictionally receive a jet ball member 47 having a single diametrically extended fluid passage 48 formed therein (Fig. 1). The ball 47 (Fig. 4) on insertion within the opening 46 rests against a shoulder 43. The rubber washer and ball assembly is maintained within a cavity 42 by a spring washer 49, of a generally dish shape, the convex side of which faces the ball 47. The washer 49 is of a size such that by pressing on its concave side the peripheral surface thereof is wedged into contact with the inner surface of the side wall 51 of the cavity 42 so that the rubber washer 44, ball member 47 and spring washer 49 are located in a cavity 42 within the confines of the body member 33. Further, the shoulder 43 and spring washer 49 constitute stop members for limiting the movement of the ball 47 laterally of the rubber washer 44. Stated otherwise, the spring washer 49 retains the ball 47 and the rubber washer 44 against the shoulder or seat 43.

In the assembly of the nozzle unit 10, relative to the windshield 11, a transverse groove 35 formed in the rear end 36 of the body member 33 is adapted to receive therein the forward edge 50 of the windshield parting strip 23. A U-shaped clamp 52 is then positioned about the supply tube 27 and secured to the parting strip 23, as by screws 53. To adjust the ball members 47 to direct a jet or liquid stream onto each section of the windshield 11 and into the paths of movement of the usual windshield wipers, indicated at 54 (Fig. 2), a pin or the like is inserted within a ball passage 48, and the ball is then moved to an adjusted position against the frictional action of the fluid-sealing washer 44.

From a consideration of the above description, it is seen that the invention provides a nozzle unit which is of a simple and economical construction, comprised of a minimum number of parts, and readily adjustable to give a desired applicational direction to the jets of liquid discharged therefrom. The outlet sections 39 and 41 are laterally extended in opposite directions so that a single nozzle unit 10 of this invention is readily adapted to supply liquid jets to both sections of a divided windshield.

Although the invention has been described with respect to a preferred embodiment thereof, it is not to be so limited since changes can be made therein which are within the full-intended scope of this invention, as defined by the appended claims.

I claim:

1. A discharge nozzle comprising, a body member having a fluid passage formed therein, one end of which constitutes an inlet section and the other end an outlet section, said outlet section being formed at its discharge end with an annular cavity to provide an annular shoulder within said outlet section, a resilient fluid-sealing washer member received in said cavity within the confines of said body member, an adjustable jet ball member frictionally received within the opening of said fluid-sealing washer member and against said shoulder, and a spring washer of a dish shape wedged within said cavity about said ball member, with said spring washer and annular shoulder constituting stop members for limiting the movement of said ball member laterally of said fluid-sealing member.

2. A discharge nozzle comprising, a body member having a fluid passage formed therein having a terminal section of an increased diameter whereby to form an annular shoulder at the inner end of said terminal section, a fluid-sealing washer member within said terminal section, an adjustable jet ball member frictionally received within the opening of said sealing member and against said shoulder, and a spring washer of a dish shape wedged within said terminal section about and in contact engagement with said ball member to hold said ball member against outward movement away from said shoulder.

3. A discharge nozzle comprising, a body member of polygonal shape in transverse section having a substantially Y-shaped transverse fluid passage formed therein having the ends thereof terminating in separate side faces of said body member, with one of said ends constituting an inlet and the remaining two ends outlets, and the side faces corresponding to said outlets being formed with annular cavities concentric with and having their bottom walls open to said outlets, adjustable ball members within said cavities adapted to rest on said bottom walls, fluid-sealing means positioned in said cavities and about said ball members so as to frictionally engage said ball members, and spring washers of a dish shape wedged within said cavities and against said ball members and fluid-sealing means to hold said ball members against said shoulders.

4. A discharge nozzle comprising, a body member having a substantially Y-shaped transverse fluid passage formed therein having the ends thereof terminating in a spaced relation on the outer surface of said body member, with one of said ends constituting an inlet and the remaining two ends outlets, and said outer surface having annular cavities corresponding to said outlets formed concentric with and having their bottom walls open to said outlets, adjustable ball members within said cavities adapted to rest on said bottom walls, fluid sealing means positioned in said cavities about said ball members so as to frictionally engage said ball members, and spring washers of a dish shape wedged within said cavities and against said ball members and fluid sealing means to hold said ball members against said shoulder.

LEONARD C. NEUFELD.

REFERENCES CITED

The following references are of record in the file of this patent:

UNITED STATES PATENTS

| Number | Name | Date |
|---|---|---|
| 1,328,399 | Reddy | Jan. 20, 1920 |
| 1,346,524 | Bard | July 13, 1920 |
| 2,196,783 | Shook | Apr. 9, 1940 |
| 2,289,650 | Horton | July 14, 1942 |
| 2,547,263 | Heimann | Apr. 3, 1951 |
| 2,548,874 | Darwin | Apr. 17, 1951 |

FOREIGN PATENTS

| Number | Country | Date |
|---|---|---|
| 573,212 | Germany | Mar. 30, 1933 |